United States Patent
Ngai et al.

(10) Patent No.: US 9,363,738 B2
(45) Date of Patent: Jun. 7, 2016

(54) APPARATUS AND METHOD FOR DYNAMIC PILOT ACQUISITION IN A WIRELESS COMMUNICATION SYSTEM

(75) Inventors: Francis Ming-Meng Ngai, Louisville, CO (US); Stanley Tsai, Boulder, CO (US); Bhaskara V. Batchu, Ameenpur Village (IN)

(73) Assignee: QUALCOMM Incorporated, San Diego, CA (US)

( * ) Notice: Subject to any disclaimer, the term of this patent is extended or adjusted under 35 U.S.C. 154(b) by 125 days.

(21) Appl. No.: 13/614,969

(22) Filed: Sep. 13, 2012

(65) Prior Publication Data

US 2013/0252607 A1    Sep. 26, 2013

Related U.S. Application Data

(60) Provisional application No. 61/582,197, filed on Dec. 30, 2011.

(51) Int. Cl.
*H04W 4/00* (2009.01)
*H04W 36/00* (2009.01)
*H04W 72/00* (2009.01)
*H04W 48/16* (2009.01)
*H04W 52/02* (2009.01)

(52) U.S. Cl.
CPC .......... *H04W 48/16* (2013.01); *H04W 52/0229* (2013.01); *H04W 52/0245* (2013.01); *Y02B 60/50* (2013.01)

(58) Field of Classification Search
CPC .................................... H04B 7/00; H04B 1/16
USPC ............ 455/434, 435.3, 436, 452.2; 370/331, 370/331.2, 332, 333
See application file for complete search history.

(56) References Cited

U.S. PATENT DOCUMENTS

| | | | |
|---|---|---|---|
| 5,889,768 A | 3/1999 | Storm et al. | |
| 6,101,173 A | 8/2000 | Bayley | |
| 6,212,398 B1 * | 4/2001 | Roberts et al. | 455/502 |
| 7,558,226 B2 | 7/2009 | Anderson et al. | |
| 8,055,273 B1 * | 11/2011 | Rai et al. | 455/456.1 |
| 8,185,115 B2 * | 5/2012 | Nader | 455/436 |
| 8,346,313 B2 * | 1/2013 | Tu | 455/574 |
| 2003/0086396 A1 * | 5/2003 | Gurski et al. | 370/335 |

(Continued)

FOREIGN PATENT DOCUMENTS

| | | |
|---|---|---|
| EP | 0154288 A2 | 9/1985 |
| EP | 1931122 A1 | 6/2008 |

(Continued)

OTHER PUBLICATIONS

International Search Report and Written Opinion—PCT/US2012/071062—ISA/EPO—May 28, 2013.

(Continued)

*Primary Examiner* — Omoniyi Obayanju
(74) *Attorney, Agent, or Firm* — Ashish L. Patel

(57) ABSTRACT

An access terminal configured for use in a wireless communication system utilizing discontinuous reception (DRx). To reduce power consumption, a pilot acquisition timeline may be reduced when channel conditions are favorable; and to improve call quality, the pilot acquisition timeline may be increased when channel conditions are poor. Other aspects, embodiments, and features are also claimed and described.

28 Claims, 6 Drawing Sheets

(56) References Cited

U.S. PATENT DOCUMENTS

| | | | |
|---|---|---|---|
| 2005/0020203 A1* | 1/2005 | Losh et al. ................... | 455/11.1 |
| 2007/0178875 A1 | 8/2007 | Rao et al. | |
| 2008/0032662 A1* | 2/2008 | Tu .............................. | 455/343.1 |
| 2008/0214249 A1 | 9/2008 | Kim et al. | |
| 2009/0168676 A1* | 7/2009 | Olson .......................... | 370/311 |
| 2010/0008259 A1* | 1/2010 | Yoon et al. ................... | 370/254 |
| 2010/0124896 A1 | 5/2010 | Kumar | |
| 2010/0279648 A1 | 11/2010 | Song et al. | |

FOREIGN PATENT DOCUMENTS

| | | |
|---|---|---|
| EP | 2157830 A1 | 2/2010 |
| WO | 0010336 A2 | 2/2000 |
| WO | 03045076 A2 | 5/2003 |
| WO | 2004042941 A1 | 5/2004 |

OTHER PUBLICATIONS

Partial International Search Report—PCT/US2012/071062—ISA/EPO—Apr. 5, 2013.

\* cited by examiner

APPARATUS AND METHOD FOR DYNAMIC PILOT ACQUISITION IN A WIRELESS COMMUNICATION SYSTEM

CROSS-REFERENCE TO RELATED APPLICATIONS & PRIORITY CLAIM

This application claims priority to and the benefit of provisional patent application No. 61/582,197, titled "APPARATUS AND METHOD FOR DYNAMIC PILOT REACQUISITION IN A WIRELESS COMMUNICATION SYSTEM," filed in the United States Patent and Trademark Office on Dec. 30, 2011, the entire content of which is incorporated herein by reference.

TECHNICAL FIELD

Embodiments of the present invention relate generally to wireless communication, and more specifically, to methods and devices for re-acquiring a pilot signal when coming out of a sleep state in access terminals.

BACKGROUND

Wireless communications systems are widely deployed to provide various types of communication content such as voice, video, packet data, messaging, broadcast, and so on. These systems may be accessed by various types of access terminals adapted to facilitate wireless communications, where multiple access terminals share the available system resources (e.g., time, frequency, and power). Examples of such wireless communications systems include code-division multiple access (CDMA) systems, time-division multiple access (TDMA) systems, frequency-division multiple access (FDMA) systems and orthogonal frequency-division multiple access (OFDMA) systems.

In some instances, access terminals may utilize include a slotted mode, or a discontinuous receive (DRx) mode, as a power-saving feature. Here, the slotted mode is a power-saving feature where the access terminal periodically turns off and on certain power-intensive circuitry, such as the RF power amplifier at the receiver. The circuitry is turned on at a known interval, so that the access terminal can listen for paging messages or other downlink information only when that information might be transmitted to the access terminal. Generally, if there is nothing transmitted for that modem, its receiver is turned back off until the next cycle. This slotted mode can occur in idle states, and in traffic states, depending on the technology used.

To listen for the paging messages, when the modem wakes up from its low-power mode and turns on its receiver, it must first search for and acquire a pilot transmitted by the base station. The goal is to acquire the pilot and start demodulating before any pertinent data arrives on the forward link (also called the downlink).

BRIEF SUMMARY OF SOME EMBODIMENTS

This brief summary presents a simplified summary of one or more aspects or embodiments of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

In accordance with various aspects of the present disclosure, power consumption at an access terminal and call performance can both be improved by dynamically adapting a pilot acquisition timeline to the channel conditions. In this way, in good conditions power consumption or standby time performance may be improved without sacrificing call performance, while in poor conditions call performance can be improved.

In one aspect, the disclosure provides a method of wireless communication operable at an access terminal. Here, the method includes waking from a low-power state, determining that at least one of a characteristic of a wireless channel, or a status of the access terminal, is sustained for a predetermined duration, adapting a pilot acquisition timeline in accordance with the determination, and searching for a pilot in accordance with the dynamically adapted pilot acquisition timeline.

Another aspect of the disclosure provides an access terminal configured for wireless communication. Here, the access terminal includes at least one processor, a receiver coupled to the at least one processor for receiving a wireless channel, and a memory coupled to the at least one processor. The at least one processor is configured to wake the access terminal from a low-power state, to determine that at least one of a characteristic of the wireless channel, or a status of the access terminal, is sustained for a predetermined duration, to adapt a pilot acquisition timeline in accordance with the determination, and to search for a pilot in accordance with the dynamically adapted pilot acquisition timeline.

Another aspect of the disclosure provides an access terminal configured for wireless communication. Here, the access terminal includes means for waking from a low-power state, means for determining that at least one of a characteristic of a wireless channel, or a status of the access terminal, is sustained for a predetermined duration, means for adapting a pilot acquisition timeline in accordance with the determination, and means for searching for a pilot in accordance with the dynamically adapted pilot acquisition timeline.

Another aspect of the disclosure provides a computer program product operable at an access terminal. Here, the computer program product includes a computer-readable storage medium having instructions for causing a computer to wake from a low-power state, instructions for causing a computer to determine that at least one of a characteristic of a wireless channel, or a status of the access terminal, is sustained for a predetermined duration, instructions for causing a computer to adapt a pilot acquisition timeline in accordance with the determination, and instructions for causing a computer to search for a pilot in accordance with the dynamically adapted pilot acquisition timeline.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
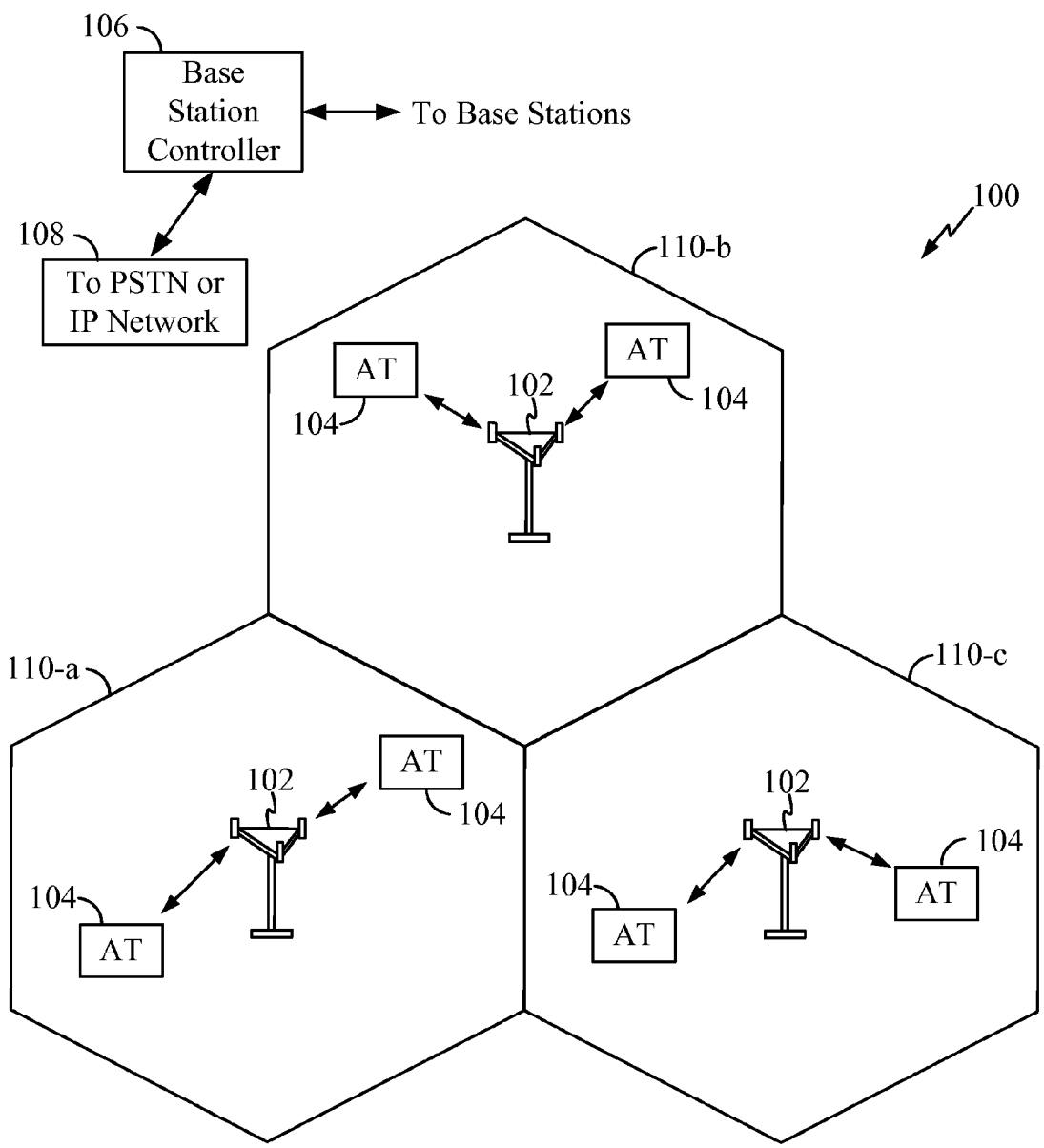
FIG. 1 is a block diagram illustrating an example of a network environment in which one or more aspects of the present disclosure may find application in accordance with some embodiments of the present invention.

Various aspects are now described with reference to the drawings. In the following description, for purposes of explanation, numerous specific details are set forth in order to provide a thorough understanding of one or more aspects. It may be evident, however, that such aspect(s) may be practiced without these specific details. Furthermore, certain benefits, other advantages and solutions to problems are described herein with regard to particular embodiments; however, any benefit, advantage, solution to a problem, or any element that may cause any particular benefit, advantage, or solution to occur or to become more pronounced are not to be construed as critical, required, or essential features or components of any or all the claims. Like reference numerals designate like elements throughout the specification.

In the context of the present specification, when an element is referred to as being "on" another element, it can be directly on the other element or be indirectly on the other element with one or more intervening elements interposed therebetween. Also, in the context of the present specification, when an element is referred to as being "connected" or "coupled" to another element, it can be directly connected or coupled to the other element or be indirectly connected or coupled to the other element with one or more intervening elements interposed therebetween.

Moreover, reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

In one or more aspects of the disclosure, the functions described may be implemented in hardware, software, firmware, or any combination thereof. If implemented in software, the functions may be stored on or transmitted over as one or more instructions or code on a computer-readable medium. Computer-readable media may be transitory or non-transitory, and may include both computer storage media and communication media including any medium that facilitates transfer of a computer program from one place to another. Storage media may be any available media that can be accessed by a general purpose or special purpose computer. By way of example, and not limitation, such non-transitory computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are transitory entities included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media. Computer-readable media may be embodied in a computer-program product. By way of example, but without limitation, a computer-program product may include a computer-readable medium in packaging materials. Those skilled in the art will recognize how best to implement the described functionality presented throughout this disclosure depending on the particular application and the overall design constraints imposed on the overall system.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, or some other terminology.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 is described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, Bluetooth, and any other short- or long-range, wireless communication techniques.

The various concepts presented throughout this disclosure may be implemented across a broad variety of telecommunication systems, network architectures, and communication standards. Although the discussions herein may present examples of CDMA and 3GPP2 1x protocols and systems, those of ordinary skill in the art will recognize that one or more aspects of the present disclosure may be employed and included in one or more other wireless communication protocols and systems. Referring now to FIG. 1, an example of a network environment in which one or more aspects of the present disclosure may find application is illustrated. Here, the wireless communication system 100 generally includes one or more base stations 102, one or more access terminals 104, one or more base station controllers (BSC) 106, and a core network 108 providing access to a public switched telephone network (PSTN) (e.g., via a mobile switching center/visitor location register (MSC/VLR)) and/or to an IP network (e.g., via a packet data switching node (PDSN)). The system 100 may support operation on multiple carriers (waveform signals of different frequencies). Multi-carrier transmitters can transmit modulated signals simultaneously on the multiple carriers. Each modulated signal may be a CDMA signal, a TDMA signal, an OFDMA signal, a Single Carrier Frequency Division Multiple Access (SC-FDMA) signal, etc. Each modulated signal may be sent on a different carrier and may carry control information (e.g., pilot signals), overhead information, data, etc.

The base stations 102 may wirelessly communicate with the access terminals 104 via a base station antenna. The base stations 102 may each include a device that facilitates wireless connectivity (for one or more access terminals 104) to the wireless communications system 100. For example, the base stations 102 may include access points, base transceiver stations (BTS), radio base stations, radio transceivers, transceiver functions, basic service sets (BSS), extended service sets (ESS), Node Bs, femto cells, pico cells, and/or some other suitable device.

The base stations 102 are configured to communicate with the access terminals 104 under the control of the base station controller 106 via multiple carriers. Each of the base stations 102 can provide communication coverage for a respective geographic area. The coverage area 110 for each base station 102 here is identified as cells 110-a, 110-b, or 110-c. The coverage area 110 for a base station 102 may be divided into sectors (not shown, but making up only a portion of the coverage area). In a coverage area 110 that is divided into sectors, the multiple sectors within a coverage area 110 can be formed by groups of antennas with each antenna responsible for communication with one or more access terminals 104 in a portion of the cell.

The access terminals 104 may be dispersed throughout the coverage areas 110, and may wirelessly communicate with one or more sectors associated with each respective base station 102. The access terminal 104 may be adapted to employ a protocol stack architecture for communicating data between the access terminal 104 and one or more network nodes of the wireless communication system 100 (e.g., the base station 102). A protocol stack generally includes a conceptual model of the layered architecture for communication protocols in which layers are represented in order of their numeric designation, where transferred data is processed sequentially by each layer, in the order of their representation. Graphically, the "stack" is typically shown vertically, with the layer having the lowest numeric designation at the base.

Figure 2:
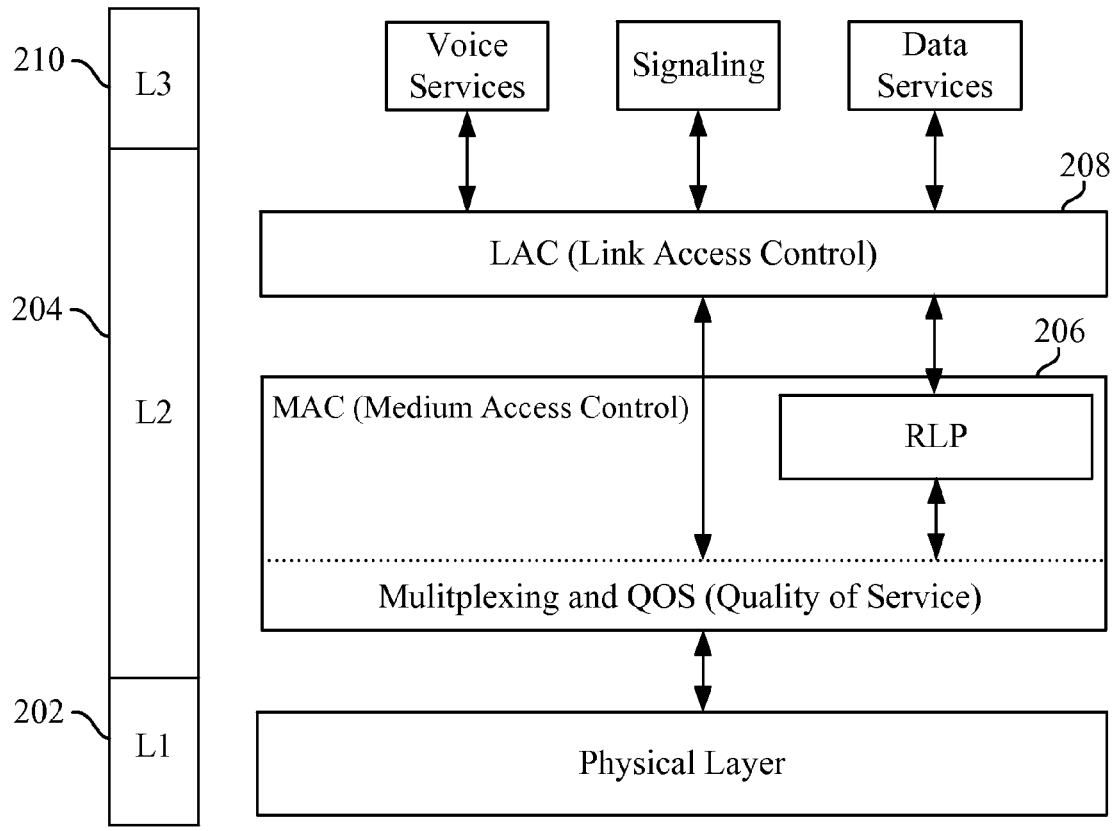
FIG. 2 is a block diagram illustrating an example of a protocol stack architecture which may be implemented by an access terminal.

FIG. 2 is a block diagram illustrating an example of a protocol stack architecture which may be implemented by an access terminal 104. Referring to FIGS. 1 and 2, the protocol stack architecture for the access terminal 104 is shown with three layers: Layer 1 (L1), Layer 2 (L2), and Layer 3 (L3).

Layer 1 202 is the lowest layer and implements various physical layer signal processing functions. Layer 1 202 is also referred to herein as the physical layer 202. This physical layer 202 provides for the transmission and reception of radio signals between the access terminal 104 and a base station 102.

The data link layer, called layer 2 (or "the L2 layer") 204 is above the physical layer 202 and is responsible for delivery of signaling messages generated by Layer 3. The L2 layer 204 makes use of the services provided by the physical layer 202. The L2 layer 204 may include two sublayers: the Medium Access Control (MAC) sublayer 206, and the Link Access Control (LAC) sublayer 208.

The MAC sublayer 206 is the lower sublayer of the L2 layer 204. The MAC sublayer 206 implements the medium access protocol and is responsible for transport of higher layers' protocol data units using the services provided by the physical layer 202. The MAC sublayer 206 may manage the access of data from the higher layers to the shared air interface.

The LAC sublayer 208 is the upper sublayer of the L2 layer 204. The LAC sublayer 208 implements a data link protocol that provides for the correct transport and delivery of signaling messages generated at the layer 3. The LAC sublayer makes use of the services provided by the lower layers (e.g., layer 1 and the MAC sublayer).

Layer 3 210, which may also be referred to as the upper layer or the L3 layer, originates and terminates signaling messages according to the semantics and timing of the communication protocol between a base station 102 and the access terminal 104. The L3 layer 210 makes use of the services provided by the L2 layer. Information (both data and voice) message are also passed through the L3 layer 210.

Figure 3:
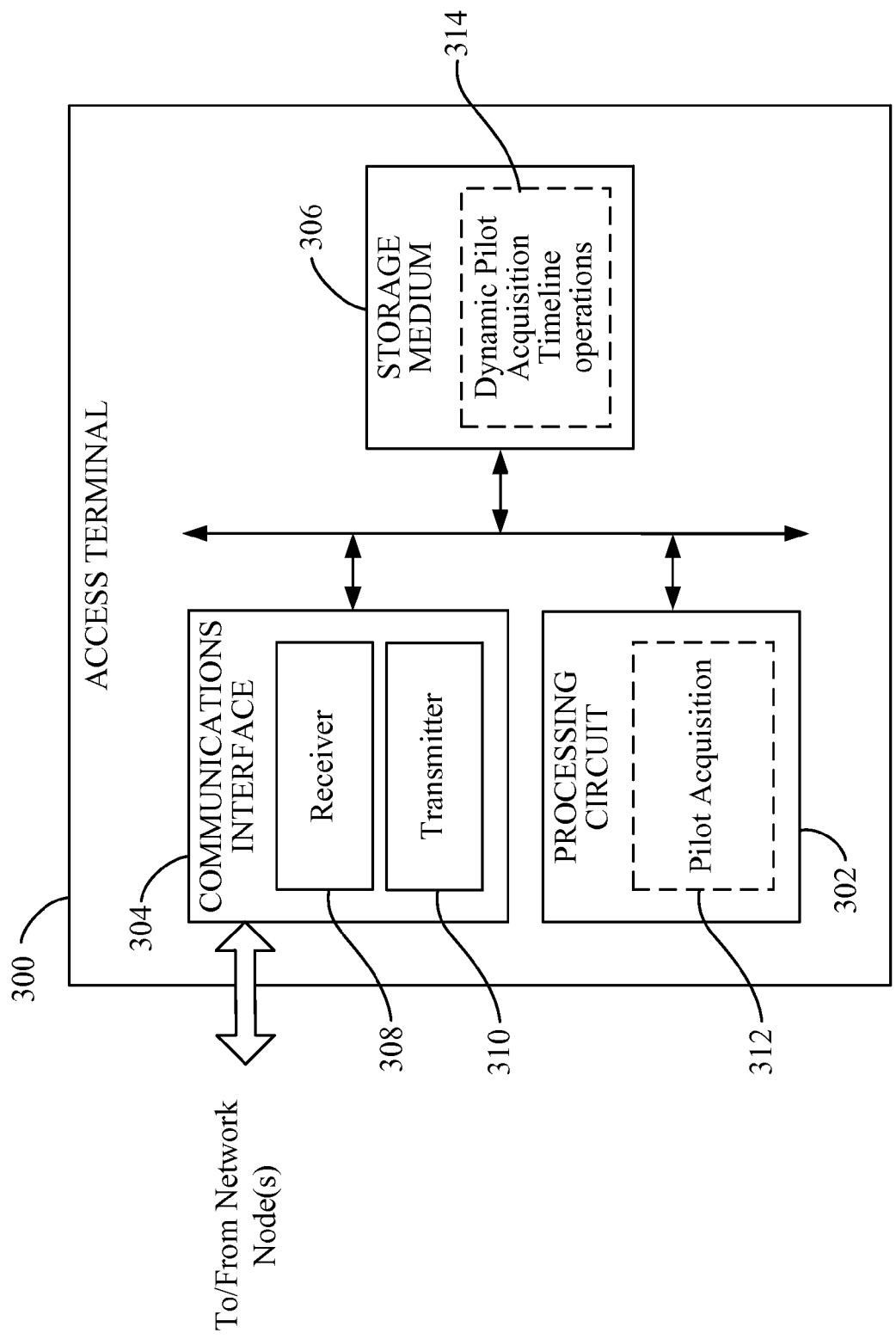
FIG. 3 is a block diagram illustrating select components of an access terminal according to at least one example.

FIG. 3 is a block diagram illustrating select components of an access terminal 300 adapted to employ such features according to at least one example. The access terminal 300 may include a processing circuit 302 coupled to a communications interface 304 and to a storage medium 306.

The processing circuit 302 is configured to obtain, process and/or send data, control data access and storage, issue commands, and control other desired operations. The processing circuit 302 may include circuitry configured to implement desired programming provided by appropriate media in at least one embodiment. For example, the processing circuit 302 may be implemented as one or more of a processor, a controller, a plurality of processors and/or other structure configured to execute executable instructions including, for example, software and/or firmware instructions, and/or hardware circuitry. Examples of the processing circuit 302 may include a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may be a microprocessor but, in the alternative, the processor may be any conventional processor, controller, microcontroller, or state machine. A processor may also be implemented as a combination of computing components, such as a combination of a DSP and a microprocessor, a number of microprocessors, one or more microprocessors in conjunction with a DSP core, or any other such configuration. These examples of the processing circuit 302 are for illustration and other suitable configurations within the scope of the present disclosure are also contemplated.

The processing circuit 302 is adapted for processing, including the execution of programming, which may be stored on the storage medium 306. In some instances, the processing circuit 302 may include a transmitter power regulator 312.

The transmitter power regulator 312 may include circuitry and/or programming adapted to monitor the transmitter 310, and regulate whether the transmitter 310 is powered on and off in response to intervals during which there is no data for transmission. Such powering on and off of the transmitter 310 is conducted independent of a dormancy timer.

The communications interface 304 is configured to facilitate wireless communications of the access terminal 300. For example, the communications interface 304 may include circuitry and/or programming adapted to facilitate the communication of information bi-directionally with respect to one or more network nodes. The communications interface 304 may be coupled to one or more antennas (not shown), and includes wireless transceiver circuitry, including at least one receiver circuit 308 (e.g., one or more receiver chains) and/or at least one transmitter circuit 310 (e.g., one or more transmitter chains). By way of example and not limitation, the at least one transmitter circuit 310 may include circuitry, devices and/or programming adapted to provide various signal conditioning functions including amplification, filtering, and modulating transmission frames onto a carrier for uplink transmission over a wireless medium through an antenna.

The storage medium 306 may represent one or more devices for storing programming and/or data, such as processor executable code or instructions (e.g., software, firmware), electronic data, databases, or other digital information. The storage medium 306 may also be used for storing data that is manipulated by the processing circuit 302 when executing programming. The storage medium 306 may be any available media that can be accessed by a general purpose or special purpose processor. By way of example and not limitation, the storage medium 306 may include a non-transitory computer-readable medium such as a magnetic storage device (e.g., hard disk, floppy disk, magnetic strip), an optical storage medium (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and/or other non-transitory computer-readable mediums for storing information, as well as any combination thereof. The storage medium 306 may be coupled to, or at least accessible by the processing circuit 302 such that the processing circuit 302 can read information from, and write information to, the storage medium 306. In the examples, the storage medium 306 may be integral to the processing circuit 302.

Programming stored by the storage medium 306, when executed by the processing circuit 302, causes the processing circuit 302 to perform one or more of the various functions and/or process steps described herein. The storage medium 306 may include dynamic pilot reacquisition operations (i.e., instructions) 314. The dynamic pilot reacquisition operations 314 can be implemented by the processing circuit 302 in, for example, the pilot reacquisition circuitry 312. Thus, according to one or more aspects of the present disclosure, the processing circuit 302 may be adapted to perform any or all of the processes, functions, steps and/or routines for any or all of the access terminals (e.g., access terminal 104 or 300) described herein. As used herein, the term "adapted" in relation to the processing circuit 302 may refer to the processing circuit 302 being one or more of configured, employed, implemented, or programmed to perform a particular process, function, step and/or routine according to various features described herein.

According to at least one aspect of the disclosure, the access terminal 300 is configured dynamically to adapt a pilot acquisition timeline. Pilot acquisition may occur, for example, when the access terminal 300 comes out of sleep in a slotted or discontinuous receive (DRx) mode. For example, a shorter time duration and/or suitably modified search parameters or algorithms may be implemented for a search for a pilot performed in good channel conditions, enabling a reduction in power consumption while maintaining call performance. Further, a longer time duration and/or suitably modified search parameters or algorithms may be implemented for a search performed in poor channel conditions, enabling an improvement in call performance by enhancing the probability of acquiring the pilot in a timely fashion.

In many different radio access technologies (RATs), a discontinuous receive (DRx) mode (referred to as a slotted mode in 1x technology) is a power-saving feature whereby an access terminal 300 periodically turns off and on certain power-intensive circuitry, including but not necessarily limited to the RF power amplifier at the receiver 308. The circuitry is turned on at a known interval, so that the access terminal 300 can monitor whether the network is transmitting paging messages or other downlink information to that access terminal 300. Generally, if there is nothing transmitted for that access terminal 300, its receiver 308 is turned back off until the next awake cycle. This slotted mode can occur in an idle mode, and in connected mode or traffic states, depending on the technology used.

When the access terminal 300 wakes from its low-power state and prepares to start receiving, typically the access terminal 300 must acquire the pilot transmitted by the base station before it can start demodulating any pertinent data on the forward link (also called the downlink).

In accordance with various aspects of the present disclosure, characteristics of a pilot acquisition timeline may adapt to the channel conditions experienced by the access terminal 300, or in some examples, to a history of prior channel conditions. Here, a pilot acquisition timeline may refer to a duration of time utilized for a process of pilot acquisition; one or more search parameters utilized to attempt to acquire the pilot; and/or the algorithm utilized to search for and acquire the pilot.

When the access terminal 300 attempts to acquire the pilot, typically it begins by searching. Following the search, frequency and time tracking may occur corresponding to an identified pilot signal. For 1x, as well as some other RATs, search parameters include a coherent integration length, a non-coherent integration length, and a window size (i.e., the number of timing hypotheses desired to be evaluated). In various aspects of the present disclosure, any one or more of these parameters, and an algorithm with which they are utilized, may be adapted in accordance with current or past channel conditions.

In certain RATs, such as 1x, a pilot is continuously transmitted by the base station 102. In such technologies, great flexibility is possible in extending or reducing the duration of the pilot acquisition timeline. In some other RATs, such as EV-DO, a gated pilot is utilized. That is, the pilot is not continuously transmitted. In these technologies, there may be certain limitations to the flexibility in altering the duration of the pilot acquisition timeline. For example, the duration of the pilot acquisition timeline generally is limited to the duration of the transmitted pilot. However, alteration of the duration of the pilot acquisition timeline is still available in gated pilot technologies. Furthermore, alteration of search parameters, or the search algorithm itself are possible regardless of whether a technology utilizes the continuous or gated pilot.

Figure 4:
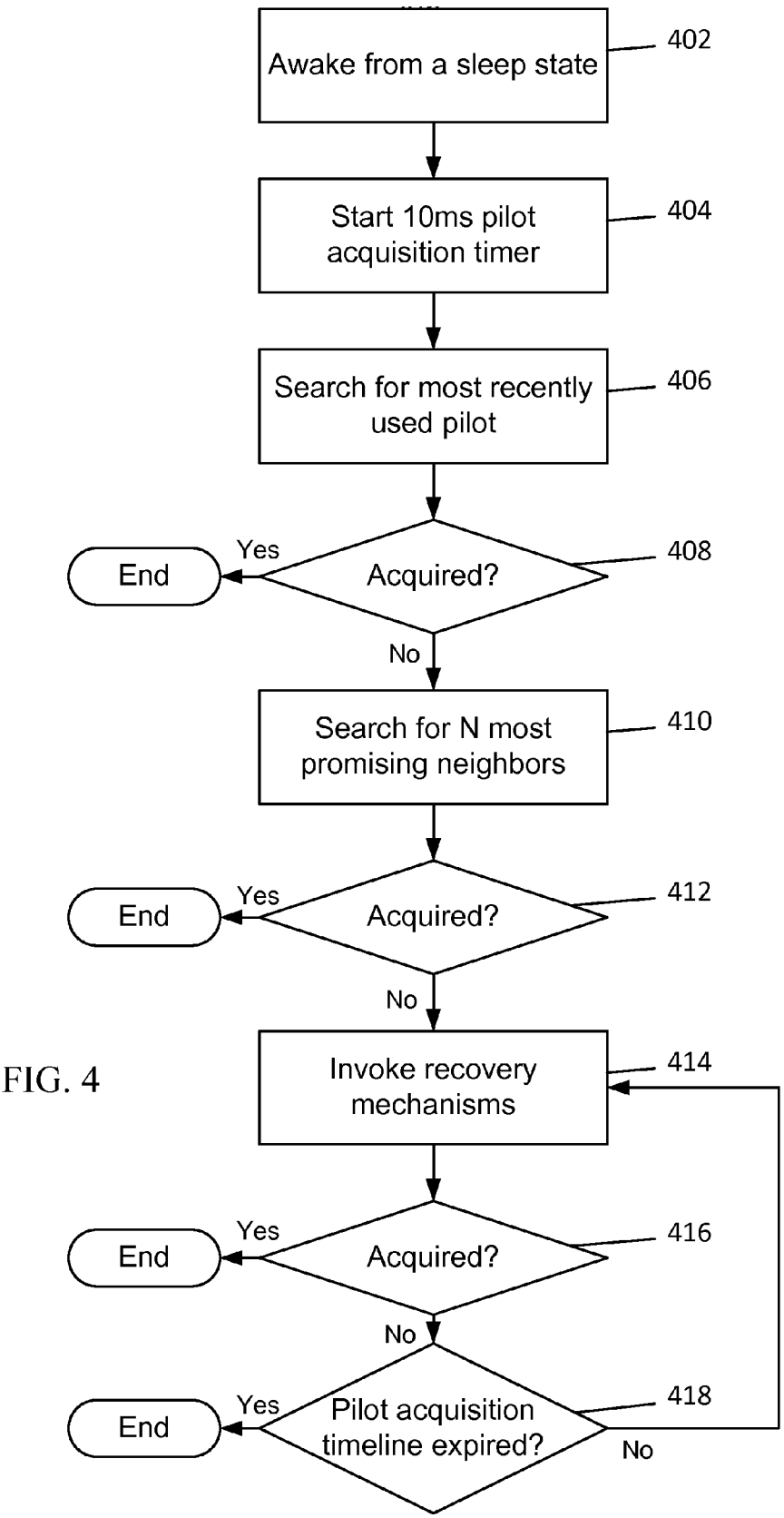
FIG. 4 is a flow chart illustrating a conventional pilot acquisition timeline.

FIG. 4 is a flow chart illustrating a process 400 operable, e.g., at an access terminal such as the access terminal 300, corresponding to a conventional pilot acquisition timeline utilized in 1x technology. In block 402, the access terminal 300 awakens from a low-power state or sleep state, such as the sleep state utilized in a slotted mode. In block 404, the access terminal 300 may start a pilot acquisition timer, e.g., having a nominal duration of 10 ms such as is utilized in conventional 1x technology.

During the running of the pilot acquisition timer, at block 406, the access terminal 300 first searches the air channels for the most recently used pilot, e.g., corresponding to the cell on which the access terminal 300 was most recently camped. If a suitable pilot is found in this or any of the following blocks, the present process ends with pilot acquisition, followed by demodulation of the forward link to receive any pertinent data from the base station. If the pilot is not found in block 408, then in block 410 the access terminal 300 searches for a certain number N (e.g., three) of its most promising neighbors. Here, the most promising neighbors may have been determined based on channel measurements made by the access terminal 300 before it went to sleep, e.g., in the previous awake cycle.

According to some embodiments, searches for the most recently used pilot in block 406 and the search for the N most promising neighbors in block 410 may be referred to as a "first attempt." If the first attempt does not yield a usable pilot in block 412, then in block 414 certain recovery mechanisms are used to search for, and hopefully find the best pilot. Details of these recovery mechanisms are known to those of ordinary skill in the art, and are not described in detail herein.

If in block 416 a pilot is not acquired, then in block 418 the access terminal 300 determines whether the pilot acquisition timeline has expired according to the pilot acquisition timer initiated in block 404. If the pilot acquisition timeline has not expired, the process continues running the recovery mechanisms described above with relation to block 414; and when the pilot acquisition timeline expires the process ends.

In a typical scenario, with good channel conditions, if an active pilot is strong, and/or perhaps if a pilot from a neighbor cell is strong, a pilot can be acquired with a high probability during the first attempt with default search parameters. In this instance, the probability of invoking the recovery mechanisms in block 414 is relatively low. Thus, during the remaining portion of the standardized 10 ms reacquisition timeline, after the pilot is acquired, the access terminal 300 may basically be sitting idle doing no productive activity, while its modem is powered up. This can be considered wasting power. Thus, in an aspect of the present disclosure, when channel conditions are good, the time allotted for the recovery mechanisms may be reduced or eliminated, since it is unlikely those mechanisms would be needed. Here, the shorter duration of the pilot acquisition timeline in good channel conditions can reduce power consumption without affecting call quality. In another aspect of the present disclosure, search parameters and/or algorithms may be altered to further save energy when searching for the strong pilot.

Further, in scenarios with poor channel conditions, with the conventional fixed 10 ms timeline for pilot acquisition, only a part of the recovery mechanisms may have sufficient time to complete. Thus, when the recovery mechanisms are invoked in block 414, it is possible that the access terminal 300 may miss the paging slot, and accordingly may miss the message that the network is transmitting to the access terminal 300. Here, to improve the probability of acquiring the pilot, according to various aspects of the present disclosure, when channel conditions are poor, a longer time may be allocated to look for the pilot, and/or search parameters or algorithms may be enhanced to detect the weaker pilot. Here, the longer timeline and/or enhanced search parameters or algorithms in poor channel conditions can enable a deeper search and additional recovery mechanisms, improving call quality.

Figure 5:
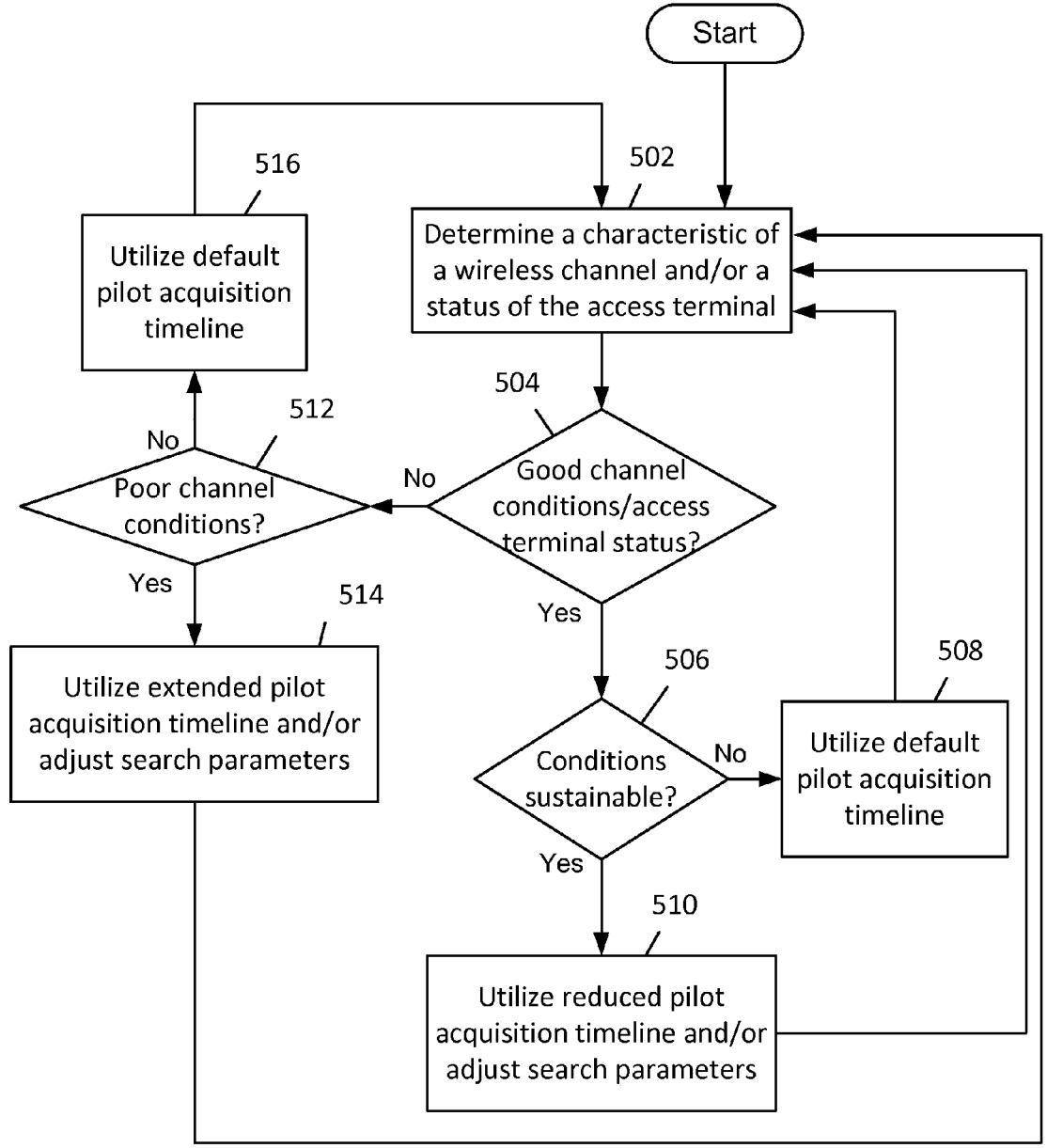
FIG. 5 is a flow chart illustrating a process for dynamic adaptation of a pilot acquisition timeline according to one example.

FIG. 5 is a flow chart illustrating a simplified process 500 operable, e.g., at an access terminal such as the access terminal 300 for implementing a dynamic pilot acquisition timeline in accordance with some aspects of the present disclosure. In various examples, the process 500 may be implemented by a processing circuit 302 (e.g., utilizing pilot acquisition circuitry 312), by an access terminal 104 or 300, or by any suitable means for performing the recited functions.

In various aspects of the present disclosure, adaptation of the pilot acquisition timeline may be taken to refer to any one or more alterations to the duration of the pilot acquisition timeline, the search parameters utilized for pilot acquisition, and/or the algorithm utilized for pilot acquisition. Thus, when referring below to an alteration of the pilot acquisition timeline, any one or more of these changes may be inferred.

In block 502, the access terminal 300 may determine a characteristic of a wireless channel, and/or a status of the access terminal 300. Here, the characteristic of the wireless channel may be a currently measured characteristic, it may be a previously determined characteristic stored in a memory 306, or a combination of these, such as an average over two or more discrete intervals of time, or a continuous duration. Further, the characteristic of the wireless channel might be a pilot measurement such as an Ec/Io, an RSCP, RSSI, or any suitable measurement of a strength or quality of a pilot. Still further, the characteristic of the wireless channel might relate to a measured characteristic of a downlink channel other than a pilot signal, and may be determined in accordance with factors such as the strength of demodulating fingers of a rake receiver; an SNR; or any suitable measurement of a strength or quality of a downlink channel. Still further, the characteristic of the wireless channel might correspond to an active pilot, a pilot from a most recent serving cell, and/or any one or more neighboring cells.

In addition or alternatively, in block 502, the status of the access terminal 300 may correspond to any number of characteristics and/or performance criteria of the access terminal 300. Non-limiting examples described below include a drift in the center of a search window; being within a time window after a call; inconsistency in slot cycle index or DRx duration; or a failure to meet one or more requirements for idle or paging operations.

For example, a drift in the center of the search window used for pilot acquisition may indicate a transient condition in the access terminal 300, making a reduction in the pilot acquisition timeline undesirable. That is, a thermal gradient, or a relatively rapid change in the temperature in the access terminal 300 may result during a certain time window just after a call or system access attempt ends, being caused by a power amplifier being turned on during the call or system access attempt on the reverse link, which generates heat. This thermal gradient may cause a crystal oscillator within the receiver 308 to drift, thereby resulting in a drift in the position of a received signal within a receive window from one awake duration to the next awake duration. Generally, it may be desired to center the search window for each awake duration. Thus, if the drift is sufficiently large, it may indicate a trend and thus invocation of the reduced pilot acquisition timeline may not be desired.

Furthermore, additional transient conditions, such as the access terminal 300 utilizing an inconsistent slot cycle index (SCI) or an inconsistent DRx duration, may indicate that utilization of the reduced pilot acquisition timeline is undesirable. Still further, if the modem within the access terminal 300 is not meeting any suitable requirements for idle or paging operations, or if the page message error rate (MER) is not below a threshold, this may additionally indicate that utilization of the reduced pilot acquisition timeline is undesirable.

Thus, having determined in block 502 the characteristic of the wireless channel and/or the status of the access terminal 300, the process 500 proceeds to block 504 wherein a decision is made as to whether the conditions are favorable for the implementation of a reduced duration of the pilot acquisition timeline, or corresponding alterations to the search parameters and/or algorithms.

If a reduced duration for a pilot acquisition timeline, or corresponding adjustments to search parameters or algorithms corresponding to good channel conditions are invoked too easily (e.g., when channel conditions are not good enough to enable pilot acquisition with these changes, or when the access terminal is in a transient state, or in a situation where elevated call performance is required), call quality may be reduced. For example, the probability that page messages on the forward link may be missed, can undesirably increase if such alterations to the pilot acquisition timeline are taken lightly. Thus, in accordance with some aspects of the present disclosure, when considering reducing the pilot acquisition timeline, some aspects of the present disclosure may utilize rather stringent entrance criteria before determining to reduce the timeline. This is to reduce the possible reduction in call quality if the timeline is prematurely reduced.

Furthermore, even if the entrance criteria are met at a particular instant, it is possible that such conditions may merely be momentary, and invocation of the reduced pilot acquisition timeline or corresponding adjustments to search parameters or algorithms may be premature. Thus, in accordance with some aspects of the present disclosure, a delay may be utilized: e.g., a window of time during which the entrance criteria are to be maintained before enabling such adjustments to the pilot acquisition timeline. Similarly, if the entrance criteria are met and the access terminal 300 does correspondingly adjust the pilot acquisition timeline, if the entrance criteria are subsequently not met, the access terminal 300 may return to the default pilot acquisition timeline for a certain period of time. That is, a hysteresis window may be utilized wherein the alterations to the pilot acquisition timeline corresponding to the good channel conditions/access terminal status may only be invoked when such conditions are maintained over the hysteresis window.

Still further, when the access terminal 300 is in a state where elevated call performance is required, such as during an E911 emergency call back (ECB) mode, or when the access terminal is in a transient state, the reduced pilot acquisition timeline and/or corresponding adjustments to search parameters may be disallowed.

Returning now to FIG. 5, block 504 may be utilized to maintain the stringent entrance criteria discussed above, to insure that the reduced pilot acquisition timeline is not entered lightly. Further, block 506 may be utilized to insure that the conditions for entering the reduced pilot acquisition timeline are sustained for a certain period of time.

Thus, in block 504 the access terminal 300 may determine whether the selected entrance criteria corresponding to good channel conditions, and/or corresponding access terminal status, are met. As discussed above, any suitable set of entrance criteria may be utilized at block 504, and generally, whether the entrance criteria are met may be determined at a modem in the access terminal 300, including the communications interface 304, the processing circuit 302, and/or the storage medium 306.

Figure 6:
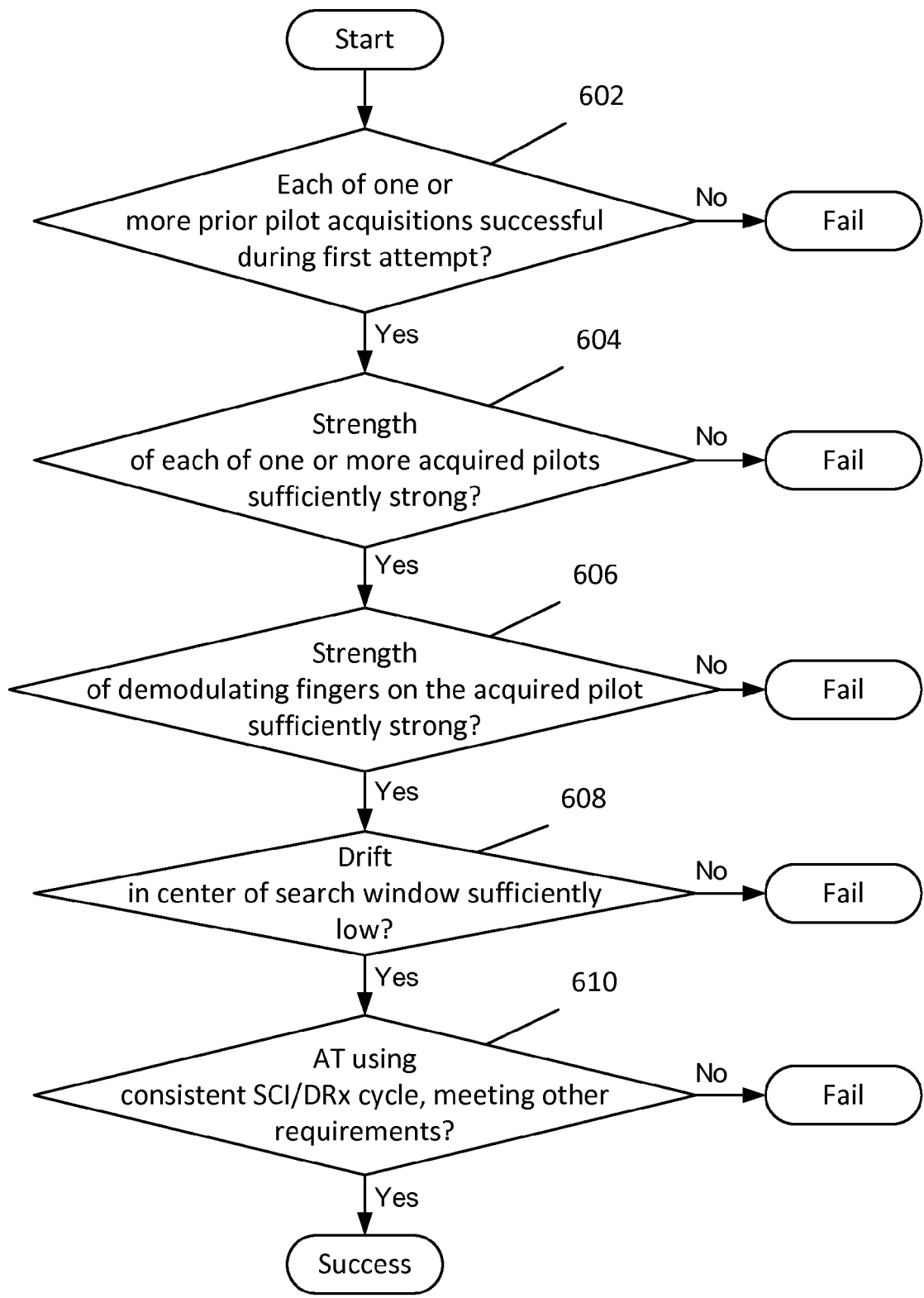
FIG. 6 is a flow chart illustrating a process of determining entrance criteria for a reduced pilot acquisition timeline according to one example.

FIG. 6 is a flow chart illustrating a process for implementing one example of entrance criteria for a reduced pilot acquisition timeline, and/or corresponding adjustments to search parameters or search algorithms that may be utilized by an access terminal 300 in block 504 of FIG. 5. In the nonlimiting illustrated example, five different entrance criteria are checked, and all five must be met in order for the reduced pilot acquisition timeline, and/or corresponding adjustments to search parameters or search algorithms to be utilized. Those having ordinary skill in the art will recognize that these factors may be implemented in any sequence including but not limited to the described sequence, and further that any one or more of the described criteria may be removed from an implemented process.

Here, in block 602, the access terminal 300 may determine whether each of one or more prior pilot acquisitions was successful during a first attempt. That is, as described above, the first attempt refers to the search for the most recently used pilot, as well as the pilot from the N most promising neighbor cells, which in some examples may be determined in a prior awake cycle. In various examples, the criterion at block 602 may be based upon any suitable number of one or more pilot acquisitions, and if any one of those one or more pilot acquisitions failed to acquire a pilot during the first attempt, the entrance criteria fail, and the current process 600 exits.

In block 604, the access terminal 300 may determine whether the strength of the successfully acquired pilot is sufficiently strong, e.g., having a signal strength greater than a suitable threshold. In some examples, the signal strength utilized for the entrance criterion in block 604 is not necessarily the most recent active pilot in a prior awake cycle. That is, as discussed above, the first attempt includes a search for the most recent active pilot as well as N strongest neighbors. Thus, a successfully acquired pilot may be the most recent active pilot in the prior awake cycle or one of the strongest neighbors, and if that acquired pilot has a sufficient signal strength, the criterion of block 604 succeeds. If the acquired pilot does not have sufficient strength, the entrance criteria fail, and the process 600 exits.

In block 606, the access terminal 300 may determine whether the strength of the demodulating fingers on the successfully acquired pilot are sufficiently strong, e.g., having a signal strength greater than a suitable threshold. In some examples, the determination in block 606 may be an instantaneous snapshot of the strength of the demodulating fingers, and in other examples, the determination in block 606 may be a composite of two or more such snapshots taken at different instances in time. In still other examples, the strength of the demodulating fingers throughout the entire awake duration may be utilized. In any case, the general idea is to look at the strength of the demodulating fingers over a suitable duration, and if the strength drops below, e.g., a predetermined threshold value, then the criterion of block 606 fails and the process 600 exits.

In some examples, the strength of a successfully acquired pilot and strength of the demodulating fingers on the successfully acquired pilot may be determined by utilizing suitable circuitry within, e.g., the communications interface 304, such as being within the receiver 308. Further, some examples may utilize the communications interface 304 in coordination with the processing circuit 312 and/or the storage medium 306 to determine current and/or previous measurements of the described signal strengths. Of course, those skilled in the art will recognize that such signal strength determining circuitry is known in the art, and for this reason details of such circuitry are not provided herein.

In block 608, the access terminal 300 may determine whether the drift in the center of the search window for pilot acquisition is sufficiently low, e.g., being below a suitable threshold. As described above, if there is a thermal gradient or a relatively rapid change in temperature of the access terminal 300, the frequency of a crystal oscillator that keeps track of time within the access terminal 300 may drift. Due to this drift, the position of the received pilot signal within the search window may change from one awake duration to the next awake duration. Due to this drift, there are mechanisms known to those skilled in the art to attempt to re-center the search window during each awake cycle. In block 608, the access terminal 300 may determine whether that drift is sufficiently large to indicate that there is a trend, such that it may not be appropriate to invoke the reduced pilot acquisition timeline, or the corresponding adjustments to the search parameters and/or algorithm. Here, if the drift in the center of the search window is not sufficiently low, e.g., being above a suitable threshold, the criterion of block 608 fails and the process 600 exits.

In block 610, with respect to idle/paging operations, the access terminal 300 may determine whether one or more various requirements for the idle/paging operations are being met. For example, the access terminal 300 may determine whether a consistent slot cycle index (SCI) and/or DRx cycle is being utilized; if not, this may indicate that the modem of the access terminal 300 may be in a transient condition, indicating that the reduced pilot acquisition timeline, or the corresponding adjustments to the search parameters and/or algorithm should not be utilized. In addition or alternatively, at block 610, the access terminal 300 may determine whether a page message error rate (MER) is suitably low, e.g., being less than a suitable threshold. In this way, if the access terminal 300 is having some problems in terms of paging channel demodulation, then it may be determined not to invoke the reduced pilot acquisition timeline, or the corresponding adjustments to the search parameters and/or algorithm. Thus, if the access terminal 300 determines that one or more various requirements for the idle/paging operations are not being met, then the criterion of block 610 fails and the process 600 exits.

Returning now to FIG. 5, recall that block 504 corresponds to a determination that good channel conditions and/or favorable access terminal status exist. While the discussion above in relation to FIG. 6 largely relates to channel conditions, certain additional factors corresponding to the status of the access terminal 300 may additionally be utilized to determine whether conditions are favorable to utilize the reduced pilot acquisition timeline. For example, in some aspects of the disclosure, the reduced pilot acquisition timeline may be disallowed when elevated call performance is required, or when the access terminal is in a transient state, such as when a call or system access attempt just ended.

For example, during a mobile originated call from a rude wakeup, or during E911 emergency call back (ECB) mode, heightened call performance may be invoked. That is, in one example, after making an emergency call utilizing the access terminal 300, there may be a certain window of time during which the emergency operator may wish to call back. During this window, utilization of the reduced pilot acquisition timeline may be undesirable as it may reduce the probability of receiving the call. In this circumstance, because call performance may be critical, some aspects of the disclosure may disallow the reduced pilot acquisition timeline.

Furthermore, when the access terminal 300 is in a transient state, such as during a suitable time window after a call or system access attempt just ended, the reduced pilot acquisition timeline may not be desirable. That is, when a call or system access attempt is invoked on the reverse link, the power amplifier at the receiver 308 is generally turned on, and may generate heat, causing a thermal gradient, etc. This may be detected according to a drift in the center of the time window for pilot acquisition searches. Here, the drift may increase as the magnitude of the temperature gradient increases. Thus, during such a circumstance, during a suitable time window corresponding to the transient state, invocation of the reduced pilot acquisition timeline may be disallowed.

Thus, if in block 504 it is determined that sufficiently good channel conditions do not exist, or that the terminal status disfavors use of the reduced pilot acquisition timeline, then the process 500 may proceed to block 512, wherein the access terminal 300 may determine whether poor channel conditions exist. For example, if a signal strength of a successfully acquired pilot is below a suitable threshold; if a strength of the demodulating fingers on the successfully acquired pilot are below a suitable threshold; if and/or if any other suitable test determines that poor channel conditions exist, then the process 500 may proceed to block 514, wherein an extended pilot acquisition timeline and/or corresponding adjustments to the search parameters for pilot acquisition may be utilized. In this fashion, an extended pilot acquisition timeline may enable improved call quality in poor channel conditions, improving the probability of acquiring a pilot by allotting more time to search for a pilot. Additionally or alternatively, suitable adjustments to search parameters and/or search algorithms may similarly improve the probability of acquiring a pilot signal in such conditions, with the potential expense of somewhat increased power usage.

If in block 512 the access terminal 300 determines that sufficiently poor channel conditions do not exist, then the process may proceed to block 516, wherein the access terminal 300 may utilize a default pilot acquisition timeline. In some examples, the detection timeline may correspond to a 10 ms timeline as utilized in current 3GPP2 standards for 1x. Of course, any suitable default pilot acquisition timeline may be utilized in block 516.

Returning now to block 504, with reference to FIG. 6, if all criteria 602-610 succeed, then the process may proceed to block 506. As discussed above, in general the criteria described in FIG. 6 may occur upon or at wake-up of the access terminal 300. However, in some aspects of the present disclosure it may be desired for these criteria to be sustained for a suitable period of time. Thus, in block 506, the access terminal may determine whether the favorable conditions determined in block 504 have been sustained for a period of time corresponding, e.g., to a predetermined window. Here, the duration of the window may be set to any suitable value, and such value may be fixed or variable, and stored for example in the storage medium 306.

If the window is not complete, then it may not be the case that the favorable conditions determined in block 504 have been sustained for the duration of the window, and thus, the process may proceed to block 508, wherein the access terminal may utilize the default pilot acquisition timeline and/or default pilot search parameters and search algorithm. In this way, in order to preserve call quality, the reduced pilot acquisition timeline or corresponding changes to the search parameters or algorithms can be held off in the potential situation where the favorable conditions are transient and go away rather quickly, and only implemented when it is known with more certainty that the favorable conditions are sustainable.

Thus, the state corresponding to the default pilot acquisition timeline, search parameters, and/or search algorithm may be maintained until the favorable conditions have been sustained for the duration of the hysteresis window in block 504. When favorable conditions are sustained for this amount of time, as determined according to the hysteresis window of block 506, the process 500 may proceed to block 510, wherein the access terminal 300 may utilize the reduced pilot acquisition timeline and/or adjust the search parameters or search algorithm for pilot acquisition.

While utilizing the reduced pilot acquisition timeline, or the corresponding adjustments to the search parameters and/or search algorithm, some aspects of the present disclosure may implement a mechanism to revert back to the default pilot acquisition timeline when any one or more of certain problems exist. For example, following the implementation of the reduced pilot acquisition timeline in block 510, the process 500 may proceed back to block 502. In this way, if for example a pilot acquisition attempt fails during a first attempt (i.e., if the criterion in block 602 of FIG. 6 fails), the access terminal 300 may revert to the default pilot acquisition timeline, or in some examples, utilize the extended pilot acquisition timeline if so determined in block 512.

In this fashion, a form of hysteresis may result, wherein it is relatively difficult to move into the reduced pilot acquisition timeline, but relatively easy to revert back to the default pilot acquisition timeline.

In some examples, the time T utilized to determine whether the favorable conditions are sustainable in block 506 may cover a plurality of DRx cycles. That is, it may be desired that T extends for such a duration as to cover the time window used for page transmissions. The time T may be derived by assuming that when the pilot acquisition failure occurred, the access terminal was actually being paged by the network. That is, the access terminal may assume that it missed a page. In this case, the time window T may be set to the time after which the page would be retransmitted by the network. Thus, the access terminal 300 may return to the default pilot acquisition timeline for the duration T to try to catch this page retransmission.

Further, while utilizing the reduced pilot acquisition timeline, if any other one or more of the criteria in blocks 604-610 of FIG. 6 fails, then in some aspects of the disclosure, the access terminal 300 may revert to using the default pilot acquisition timeline for a suitable hysteresis window. Here, the hysteresis window may be a single pilot acquisition, after which a return to the reduced pilot acquisition timeline may be allowed.

That is, the time T utilized in block 506 for determining whether the favorable conditions are sustainable may vary, in accordance with one or more factors such as whether the reduced pilot acquisition timeline is currently being utilized, which entrance criterion last failed, etc.

Several aspects of a telecommunications system have been presented with reference to a CDMA 1x system. As those skilled in the art will readily appreciate, various aspects described throughout this disclosure may be extended to other telecommunication systems, network architectures and communication standards.

Furthermore, it is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

We claim:

1. A method of wireless communication operable at an access terminal, comprising:
   waking from a low-power state;
   determining entrance criteria comprising:
      a drift in a center of a search window for a pilot search is less than a predetermined threshold; and
      a strength of a successfully acquired pilot is greater than a predetermined threshold;
   if the entrance criteria are maintained over a hysteresis window, adapting a pilot acquisition timeline; and
   searching for a pilot in accordance with the dynamically adapted pilot acquisition timeline.

2. The method of claim 1, wherein the adapting of the pilot acquisition timeline comprises: reducing a duration of the pilot acquisition timeline relative to a default duration.

3. The method of claim 2, wherein the adapting of the pilot acquisition timeline comprises altering a search parameter corresponding to a search for a pilot.

4. The method of claim 2, wherein the adapting of the pilot acquisition timeline comprises altering a search algorithm corresponding to a search for a pilot.

5. The method of claim 1, wherein the entrance criteria further comprise:
   a strength of demodulating fingers on a successfully acquired pilot is greater than a predetermined threshold.

6. The method of claim 1, wherein the entrance criteria further comprise:
   at least one of a variance in a slot cycle index is less than a predetermined threshold; a variance in a DRx cycle is less than a predetermined threshold; or a page message error rate is less than a predetermined threshold.

7. The method of claim 1, wherein the entrance criteria further comprise:
   at least one prior pilot acquisition successfully acquired a pilot during a first attempt;
   a strength of demodulating fingers on a successfully acquired pilot is greater than a predetermined threshold; and
   at least one of a variance in a slot cycle index is less than a predetermined threshold; a variance in a DRx cycle is less than a predetermined threshold; or a page message error rate is less than a predetermined threshold.

8. The method of claim 1, wherein the entrance criteria further comprise:
   the access terminal is not in an emergency call back mode.

9. The method of claim 1, wherein the entrance criteria further comprise:
   a predetermined time window following an ending of one of a call or a system access attempt has expired.

10. The method of claim 1, wherein the adapting of the pilot acquisition timeline comprises: extending a duration of the pilot acquisition timeline relative to a default duration in accordance with a determination that a characteristic of a wireless channel indicates a poor channel quality.

11. The method of claim 10, wherein the adapting of the pilot acquisition timeline further comprises altering a search parameter corresponding to a search for a pilot.

12. The method of claim 10, wherein the adapting of the pilot acquisition timeline further comprises altering a search algorithm corresponding to a search for a pilot.

13. An access terminal configured for wireless communication, comprising:
   at least one processor;
   a receiver coupled to the at least one processor; and
   a memory coupled to the at least one processor,
   wherein the at least one processor is configured to:
      wake the access terminal;
      determine entrance criteria comprising:
         a drift in a center of a search window for a pilot search is less than a predetermined threshold; and
         a strength of a successfully acquired pilot is greater than a predetermined threshold;
      if the entrance criteria are maintained over a hysteresis window, adapt a pilot acquisition timeline; and
      search for a pilot in accordance with the dynamically adapted pilot acquisition timeline.

14. The access terminal of claim 13, wherein the processor is further configured to reduce a duration of the pilot acquisition timeline relative to a default duration.

15. The access terminal of claim 13, wherein the processor is further configured to alter a search parameter corresponding to a search for a pilot.

16. The access terminal of claim 13, wherein the processor is further configured to alter a search algorithm corresponding to a search for a pilot.

17. The access terminal of claim 13, wherein entrance criteria further comprise:
   a strength of demodulating fingers on a successfully acquired pilot is greater than a predetermined threshold.

18. The access terminal of claim 13, wherein the entrance criteria further comprise:
   at least one of a variance in a slot cycle index is less than a predetermined threshold; a variance in a DRx cycle is less than a predetermined threshold; or a page message error rate is less than a predetermined threshold.

19. The access terminal of claim 13, wherein the entrance criteria further comprise:
   at least one prior pilot acquisition successfully acquired a pilot during a first attempt;
   a strength of demodulating fingers on a successfully acquired pilot is greater than a predetermined threshold; and
   at least one of a variance in a slot cycle index is less than a predetermined threshold; a variance in a DRx cycle is less than a predetermined threshold; or a page message error rate is less than a predetermined threshold.

20. The access terminal of claim 13, wherein the entrance criteria further comprise:
the access terminal is not in an emergency call back mode.

21. The access terminal of claim 13, wherein the entrance criteria further comprise:
a predetermined time window following an ending of one of a call or a system access attempt has expired.

22. The access terminal of claim 13, wherein the adapting of the pilot acquisition timeline comprises extending a duration of the pilot acquisition timeline relative to a default duration in accordance with a determination that a characteristic of a wireless channel indicates a poor channel quality.

23. The access terminal of claim 22, wherein the adapting of the pilot acquisition timeline further comprises altering a search parameter corresponding to a search for a pilot.

24. The access terminal of claim 22, wherein the adapting of the pilot acquisition timeline further comprises altering a search algorithm corresponding to a search for a pilot.

25. An access terminal configured for wireless communication, comprising:
means for waking from a low-power state;
means for determining entrance criteria comprising:
a drift in a center of a search window for a pilot search is less than a predetermined threshold; and
a strength of a successfully acquired pilot is greater than a predetermined threshold;
means for if the entrance criteria are maintained over a hysteresis window, adapting a pilot acquisition timeline in accordance with the determination; and
means for searching for a pilot in accordance with the dynamically adapted pilot acquisition timeline.

26. The access terminal of claim 25, wherein the means for adapting the pilot acquisition timeline is configured to reduce a duration of the pilot acquisition timeline relative to a default duration.

27. A computer program product operable at an access terminal, comprising:
a non-transitory computer-readable storage medium comprising:
instructions for causing a computer to wake from a low-power state;
instructions for causing a computer to determine entrance criteria comprising:
a drift in a center of a search window for a pilot search is less than a predetermined threshold; and
a strength of a successfully acquired pilot is greater than a predetermined threshold;
instructions for causing a computer if the entrance criteria are maintained over a hysteresis window, to adapt a pilot acquisition timeline; and
instructions for causing a computer to search for a pilot in accordance with the dynamically adapted pilot acquisition timeline.

28. The computer program product of claim 27, wherein the instructions for causing a computer to adapt the pilot acquisition timeline are configured to reduce a duration of the pilot acquisition timeline relative to a default duration.

* * * * *